3,360,850
VIBRATORY BONDING UTILIZING A TUNED ANVIL

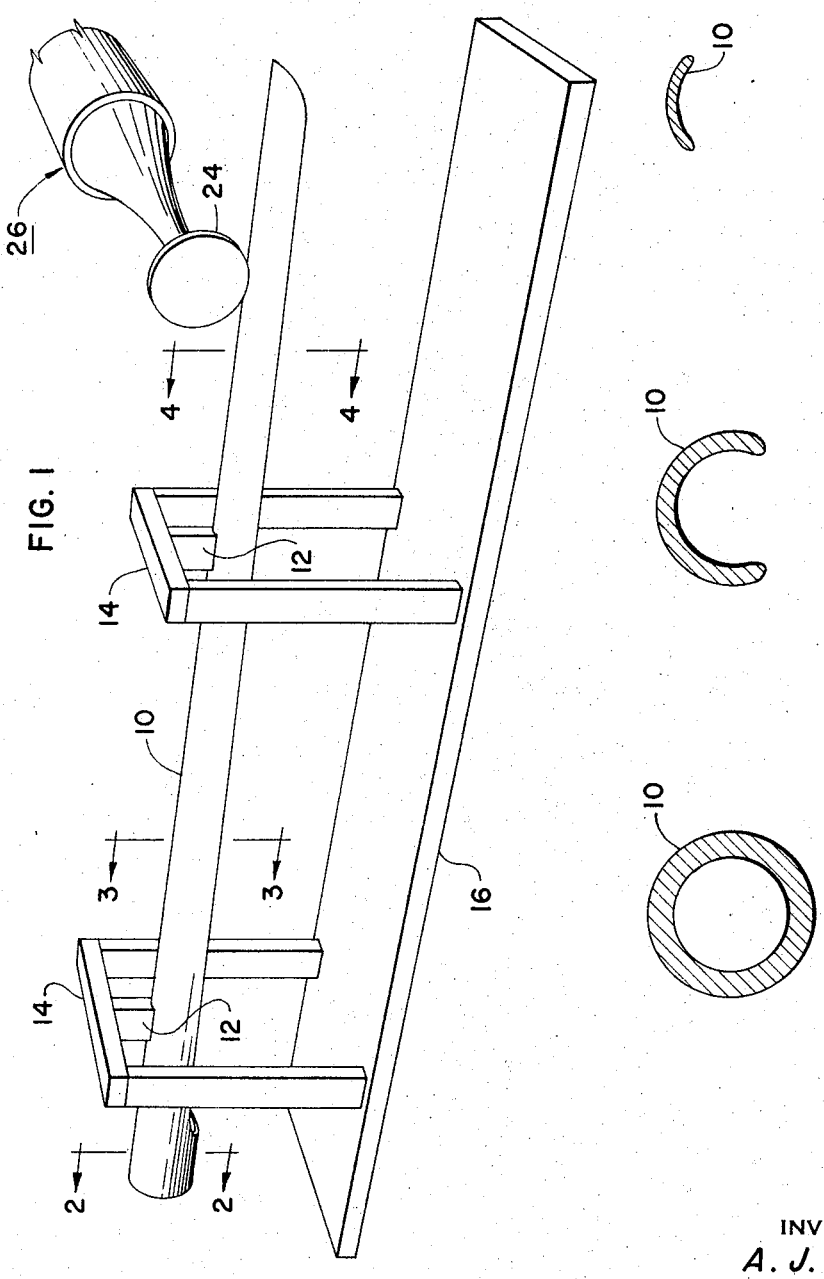

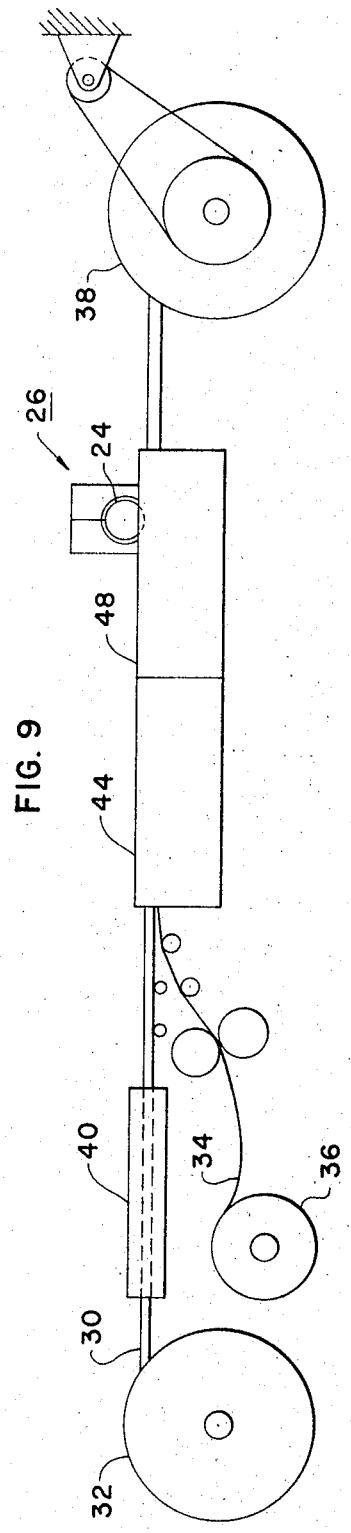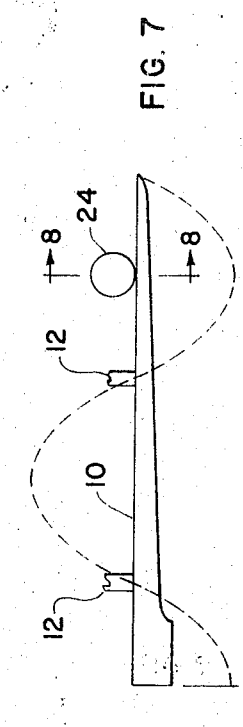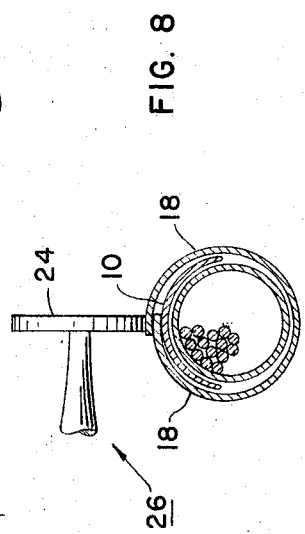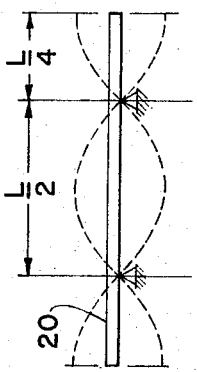

Arthur Julian Avila, Middlesex Township, Middlesex County, N.J., assignor to Western Electric Company, Incorporated, New York, N.Y., a corporation of New York
Filed May 24, 1965, Ser. No. 458,235
11 Claims. (Cl. 29—470.1)

ABSTRACT OF THE DISCLOSURE

This disclosure is directed to a method and apparatus for accomplishing vibratory bonding utilizing a tuned anvil. A method according to the present teaching includes the steps of supporting an anvil at one or more points, supporting workpieces in overlapping relation on the anvil, and applying vibratory energy to the overlapping portions of the workpieces to bond them together and to produce on the anvil a standing wave pattern having an anti-node at the point of application of the vibratory energy and a node at each point at which the anvil is supported. Apparatus for practicing the above-described method includes an anvil for supporting workpieces to be bonded, the anvil being supported at two nodal points of a standing wave set up therealong by the application of a vibratory force at substantially its natural frequency, and vibratory bonding apparatus for imparting vibratory energy to the workpieces and the anvil.

---

This invention relates to methods of and apparatus for utilizing vibratory energy for bonding workpieces and more particularly, to methods of and apparatus for utilizing an acoustically tuned anvil for bonding a seam on a tubular member.

In the manufacture of tubing, it has been customary to form a flat strip of metal into a cylindrical configuration having a seam formed between overlapping longitudinal surfaces of the strip. When the tubing is utilized as a sheath for electrical cable, the flat strip is formed around the cable and the seam is then bonded.

Prior apparatus for bonding a seam on tubular members such as cable sheaths, have included inert gas shielded welding apparatus capable of operation at speeds of about one meter per minute. Use of such welding apparatus has been limited because the heat generated during the operation thereof has been thought to be sufficiently high so as to impair the electrical characteristics of the cable.

Another form of bonding apparatus, vibratory bonding apparatus, has in the past been used for joining a seam formed between flat, overlapping workpieces. Such apparatus typically includes a circular bonding tip which is vibrated at a selected operating frequency, and a massive anvil, such as a heavy metal block, which is de-turned or non-compliant at the selected operating frequency. The rotary bonding tip urges the overlapping workpieces toward the massive anvil and vibrates the workpieces to bond the seam.

During such a vibratory bonding operation, a portion of the vibratory bonding energy from the bonding tip passes or is transmitted through the workpieces toward the massive anvil. The massive anvil has been used in an endeavor to reflect as much as possible of the transmitted vibratory bonding energy back into the workpieces for utilization in bonding the workpieces. Despite the massive nature of the heavy metal blocks forming such a massive anvil, experiments indicate that such massive anvils reflect only approximately 5 to 10 percent of the transmitted vibratory bonding energy back into the workpieces. The remaining 90–95% of the vibratory energy is dissipated, in part, in the massive anvil and may also be dissipated by transmission to an acoustical ground, such as a frame, which supports the massive anvil. If the portion of the vibratory energy that is transmitted into the massive anvil is substantial, the amount of vibratory energy available for bonding is severely limited, rendering vibratory bonding systems utilizing such anvils relatively inefficient.

Additionally, in the design of such massive anvils, it is extremely difficult to relate the mass of the anvil to the acoustical characteristics of the vibratory bonding system.

Furthermore, such massive anvils are inherently large in physical size and cannot be reduced in size sufficiently to pass into small diameter tubular members without destroying, or excessively impairing, the vibratory reflection properties of such massive anvils.

Research conducted in an endeavor to provide efficient methods of and vibratory bonding apparatus for bonding seams on small diameter tubular members, for example, and resulting in the present invention, indicates that an acoustically tuned anvil which is resonant, or subsstantially so, at the operating frequency of the input vibratory energy of the bonding system, renders such system effective to produce more efficient bonds and to produce bonds on smaller diameter tubular members. Moreover, because the acoustically tuned anvils resonate at approximately the operating frequency of the vibratory bonding system, a minimum of energy is utilized to vibrate the acoustically tuned anvils. Significantly, such acoustically tuned anvils may be constructed having sufficiently small physical size so as to be received in a tubular member for supporting overlapping surfaces of the member at a bonding zone during a seam bonding operation.

The acoustically tuned anvil is operated at a resonant condition, i.e., is vibrated at its natural frequency, or substantially so, and a standing wave is set up along the anvil having, as is well known, nodal, and antinodal or loop points along its length. Supporting members engage the anvil at a nodal point or points and the anvil supports the tubular member and presents the overlapping surface for engagement with the vibratory disk of a bonding tool at an antinode or loop of the standing wave. The vibratory disk imparts vibratory energy or vibrations to the overlapping surface of the tubular member and to the anvil also and, hence, the overlapping surfaces are bonded together. Since the anvil is tuned acoustically, and operating at a substantial resonant condition, the efficiency of the bonding is greatly increased over the prior art bonding systems utilizing the massive anvils.

It will be recognized that although the present invention was discovered in an investigation directed toward anvils suitable for utilization with bonding systems for small diameter tubular members, the present invention is applicable to other bonding systems in which the size of the anvil is not necessarily critical. Such other vibratory bonding systems could use the present invention to achieve an economy in input vibratory energy for a given speed of operation, or could increase the efficiency of operation for a given input vibratory energy.

An object of the present invention is to provide a new and improved method of bonding workpieces.

Another object of the present invention is to provide a new and improved method of bonding a seam on workpieces utilizing vibratory energy and an acoustically tuned anvil.

Another object of the present invention is to provide a new and improved method of bonding with vibratory energy whereby the amount of the input vibratory energy utilized for the actual bonding is greatly increased.

Another object of the present invention is to provide a new and improved method of bonding with vibratory energy whereby, for a given level of input vibratory energy, the rate at which the bonding occurs is greatly increased.

A further object of the present invention is to provide a new and improved method of bonding a continuous longitudinal seam on a tubular member utilizing vibratory energy and an acoustically tuned anvil supporting the tubular member and operating at a resonant condition.

A still further object of the present invention is to provide new and improved apparatus for bonding workpieces.

Yet a further object of the present invention is to provide new and improved apparatus for bonding a seam on workpieces utilizing vibratory energy and an acoustically tuned anvil.

A further object of the present invention is to provide new and improved apparatus for bonding with vibratory energy whereby the amount of the input vibratory energy utilized in the actual bonding is greatly increased.

A still further object of the present invention is to provide new and improved apparatus for bonding with vibratory energy where, for a given level of input vibratory energy, the rate of bonding is greatly increased.

An even further object of the present invention is to provide apparatus for bonding a seam on a tubular member formed from flat strip stock by utilizing vibratory energy and an acoustically tuned anvil supporting the tubular member and operating at a resonant condition.

A feature of the present invention is embodied in the method of bonding workpieces together utilizing vibratory energy and which includes the steps of supporting an anvil at one or more points thereof, supporting the workpieces in overlapping relation on the anvil and applying vibratory energy to the overlapping portions of the workpieces to bond them together and to produce on the anvil a standing wave pattern having an antinode at the point of application of the vibratory energy and a node at each point at which the anvil is supported.

Another feature of the present invention is embodied in apparatus for bonding workpieces, which includes an anvil for supporting said workpieces and being supported for vibration at substantially its natural frequency; and vibratory bonding means for imparting vibratory energy to the workpieces and the anvil.

An even more complete understanding of the present invention may be gained from the following detailed description when read in conjunction with the appended drawings wherein:

FIG. 1 is a perspective view of an anvil suitable for practicing the present invention;

FIGS. 2, 3 and 4 are sectional views of the anvil taken from FIG. 1 along the lines 2—2, 3—3, 4—4, respectively, and in the direction of the arrows;

FIGS. 5, 6 and 7 are diagrammatic representations utilized in explaining a theory of operation on which the present invention may be based;

FIG. 8 is a view, partially in cross-section, showing the manner in which the tuned anvil can be used to bond a cable sheathing around a cable core;

FIG. 9 is another diagrammatic representation showing how the present invention may be utilized in a continuous cable sheathing operation.

Figure 10:
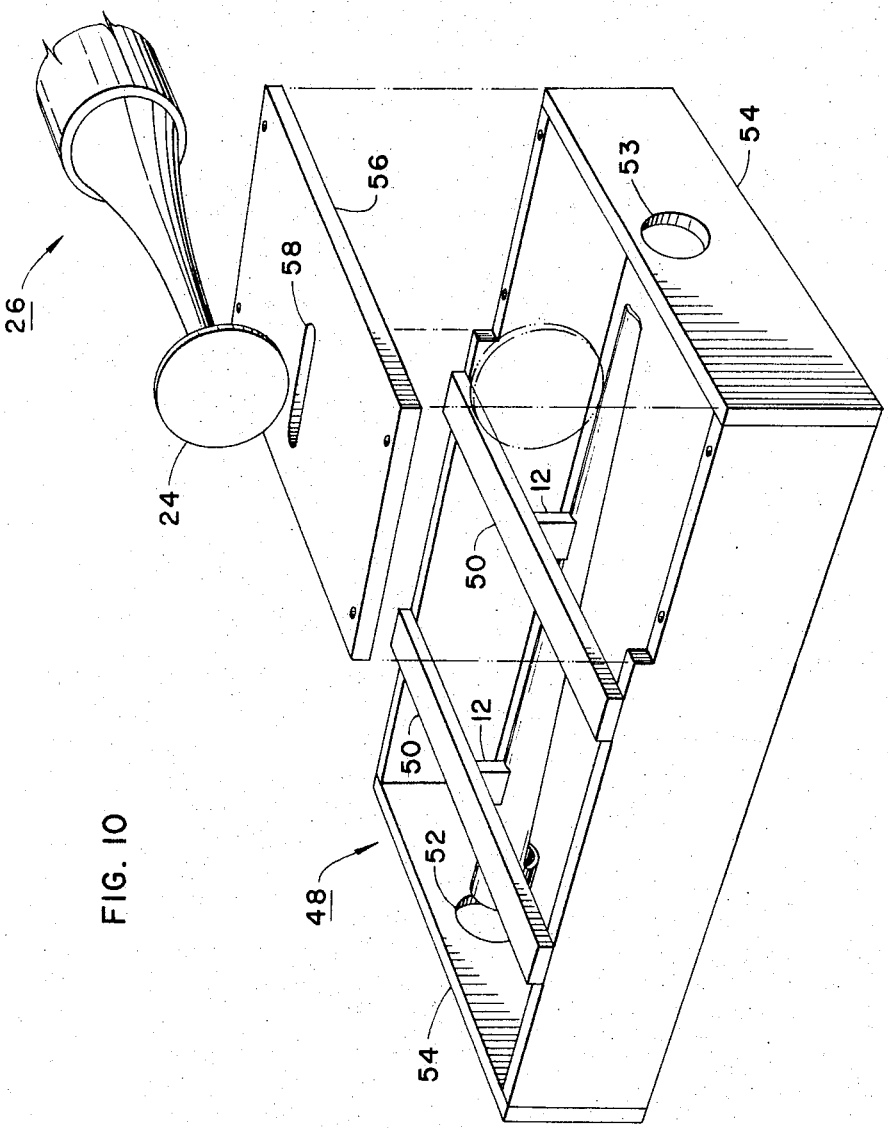
FIG. 10 is a partially exploded diagrammatic representation, showing in solid and dashed outline the relative physical arrangement of certain structure.

Referring now to FIG. 1 there is shown a generally elongated anvil 10 supported dependingly by blocks 12 and inverted, generally U-shaped supports 14, which supports are secured to a base member 16. In general, the anvil 10, as viewed from the side in FIG. 1 is an elongated structure with a portion of the under side tapering gradually upwardly from its rearward extremity to its forward extremity. As shown by the sectional views of FIGS. 2, 3 and 4, the rearward portion has the configuration of a hollow cylinder with the internal diameter sized in accordance with, for example, a cable core to be sheathed, and the outer diameter sized in accordance with the internal diameter of the tubular member to be fabricated; such tubular member may be, for example, a metal sheathing for surrounding the cable core. The walls of the anvil, as also shown by the sectional views 2, 3 and 4 vary in thickness by gradually becoming less thick as measured progressively from the rear toward the front. The particulars with regard to how the present invention may be employed in a cable core sheathing operation will be explained in detail infra.

As will be seen, the anvil 10 is constructed and supported so as to be tuned acoustically to a source of vibratory energy and to operate at a resonant or substantially resonant condition.

Referring now to the theory of operation of the present invention, the following theory of operation it is believed, provides an adequately satisfactory basis for explaining the operation of the present invention.

However, in order to provide a background for purposes of explanation, consideration will first be given to simple longitudinal vibrations occurring in a solid rod which has been placed in a state of vibration. Such a rod, as well as any other mass, has a natural frequency at which free vibrations occur, i.e., if vibrations were imparted, such a rod or other mass, would be vibrating at a multitude of frequencies, simultaneously, most of which would cancel each other out and only the free vibrations would persist. The frequency of the free vibrations is known as the natural frequency of the body and the possible modes of vibration will among other things, depend upon the manner in which the rod, or other mass is supported. Furthermore, and very significantly, once the free vibrations are present, the amount of input vibrating energy, or vibrations, may be decreased such that the input merely reinforces the free vibrations to perpetuate or maintain and continue them, and hence, resonance is created. The rod, or other mass, can then be said to be acoustically tuned and operating at a resonant condition.

Referring now to FIG. 5, it is well known that if a rod, such as 20, is properly supported at one end and vibratory energy is imparted thereto, the rod will vibrate in its fundamental mode with a node occurring at the attached end and an antinode (place of maximum displacement) occuring at the opposite or free end. So driven, the rod will form a half loop and the wave length λ will extend over four rod length L or 4L. Expressed mathematically:

$$L = \frac{\lambda}{4}$$

$$\lambda = 4L$$

Further, if a rod 20 is supported at alternate quarter nodal points as shown in FIG. 6 and vibratory energy is imparted thereto, two full loops are formed in each the up and down modes. And, in general, if there are $n$ loops the wave length of the vibration is $$\lambda = \frac{2L}{n}$$

(theory shows that this is true only when the wave length is large in comparison with the thickness of width of the rod). Expressed mathematically:

$$L = \frac{4\lambda}{4}$$

$$\lambda = L$$

This second mentioned condition is used in the present invention.

As may be readily seen from investigation of the second condition, the mathematical expression for determining the wave length for a mass the shape of rod 20 is simple and uncomplicated, particularly, when the material comprising the rod, and the size and shape of the rod, are all uniform or homogeneous. Obviously a mathematical expression for determining the wave length of a mass having the configuration of the anvil 10 would be vastly more complex. Although such a mathematical expression could be derived, an empirical approach is much to be desired as it is much more easy and practical to impart vibratory energy to the rod and trace the standing wave, and determine the nodal points, by utilizing an accelerometer in the manner well known to the art, namely and briefly, by passing the probe of the accelerometer along the rod and viewing the resulting wave form(s) on an associated viewing screen.

The anvil 10 show diagrammatically in FIG. 7, is acoustically tuned and is operating at a resonant condition. In actual operation, the anvil would support workpieces 18 as shown in FIG. 8 such workpieces being, for example, the previously suggested tubular member of cylindrically shaped metal cable sheath, with the portions to be bonded being exposed to a vibrating disk 24 of an ultrasonic bonding tool 26; the tool being better seen at least in part in FIGS. 8 and 10.

The anvil 10 is acoustically tuned and resonance created in the following manner utilizing the aforementioned empirical approach for acoustical tuning:

The vibrating disk is brought into engagement with the workpieces to impart, as previously described, vibratory energy or vibrations to the workpieces and to the anvil. Referring again to FIG. 7 using the accelerometer in the manner described, the wave shape of the natural frequency of the anvil and the natural frequency points are readily determined. The anvil is then supported by the blocks 12 at nodal points as shown in FIG. 7 and the vibratory disk, if not already so positioned, is positioned longitudinally of the anvil so as to engage the workpieces at an antinode, or position of maximum vertical displacement, of the acoustically tuned anvil. The level of the input energy is then decreased so as to no longer drive the anvil but to only reinforce the free vibrations occurring at the anvil at the natural frequency and, thus, resonance is created and the anvil is acoustically tuned and is operating at a resonant condition. With the anvil and ultrasonic bonding tool so operating, the percent of input vibratory energy actually utilized in the bonding operation is greatly increased over the percent actually being utilized in other ultrasonic bonding apparatus using the massive anvils of the prior art.

It will be understood that the frequency of the input vibratory energy will vary with the configuration, length, thickness, etc., of each different anvil employed. Accordingly, the significance of the empirical approach to determine the operating frequency to be used will be greater appreciated.

It will be understood also that in the actual bonding operation, i.e., with the overlapping workpieces surrounding the anvil and passing the bonding head, the frequency of the input vibratory energy necessary to establish the previously described standing wave along the anvil, will have to be adjusted to compensate for the presence of the workpiece whose presence will be reflected into the acoustical system. However, the previously referred to accelerometer can be conveniently utilized, while actual bonding is taking place, to indicate the presence of the desired standing wave along the anvil. As the probe of the accelerometer is passed along the vibrating anvil, and surrounding workpiece, the operating frequency of the bonding tool can be adjusted until the desired standing wave is present along the anvil, such presence being indicated on an associated viewing screen.

In one actual embodiment of the present invention utilized to bond 0.001 inch aluminum sheathing, operating frequencies in the range of from 15,000 c.p.s. to 16,000 c.p.s. worked particularly well with an anvil 15 inches long, 1.25 inches in diameter, and varying in thickness from 0.035 inch to 0.050 inch.

In another actual embodiment of the present invention, a bonding rate of 400 feet per minute was achieved. And in a direct comparison made between an actual embodiment of the present invention and a prior art bonding system utilizing a massive anvil, the present invention gave results one order of magnitude better. More specifically, wtih an input vibrating energy to both systems of 300 watts, the present invention produced a bonded seam on 0.001 inch aluminum at the rate of 15 feet per minute whereas the prior art bonding systems produced a bonded seam on such metal at a rate of only 1.5 feet per minute. A ratio of 10 to 1.

The present invention is embodied in the continuous cable sheating apparatus shown in FIG. 9, which apparatus forms a flat strip of metal into a tubular or cylindrically-shaped cable sheath having overlapping longitudinal edges around a cable core. The cable core is passed internally of the acoustically tuned anvil and the cable sheath is passed over the external surface of the anvil which is supported at two of its nodal points. The overlapping longitudinal edges of the sheath passed between the vibratory disk of the bonding tool and the acoustically tuned anvil, which operate as described above, and the overlapping sheath edges are bonded together in a continuous longitudinal seam. The sheathed cable core is then wound into a take-up reel, or may be passed on to another station for further cable processing.

More specifically, and referring again to FIG. 9, there is shown a supply of cable core 30, wound on a cylindrical supply reel 32, and a supply of flat metal strip stock 34, wound on a supply reel 36. The cable core and strip stock are pulled off of their respective supply reels 32 and 36 by a take-up reel, or capstan 38 which is suitably mounted and rotated in a manner well known to the cable art. As the cable core and strip stock are pulled forward, they are supported and guided by cable core guide 40 and rollers (as shown), into the sheath forming apparatus represented generally by the reference number 44.

The sheath forming apparatus 44 may be the cable sheath forming apparatus disclosed in U.S. Patent No. 2,908,314 issued Oct. 13, 1959 to Western Electric Company Incorporated as assignee of A. L. Loucks.

However, it will be understood that the present invention is not limited to such specific sheath forming apparatus and that many other such similar tubular forming apparatus may also be employed successfully with the present invention.

Briefly, the cable sheath forming apparatus 44 includes a plurality of dies of successively smaller diameters, which gradually curve or bend the flat strip of metal upwardly around the cable core until the metal strip assumes the tubular or cylindrical configuration of a cable sheath with overlapping longitudinal surfaces extending longitudinally along the top of the sheath.

The apertures 52 and 53 shown in FIG. 10 are also part of the cable sheathing forming dies, and aperture 53 is sized so as to assume that the overlapping surfaces of the cable sheathing are overlapped to the proper degree when engaged by the vibratory disk 24 of the bonding tool 26.

The cable core surrounded by the cable sheath is advanced by the take-up reel 38 into the anvil supporting apparatus represented generally by reference number 48. Apparatus 48 can be seen in greater detail in FIG. 10 wherein the anvil 10 is supported dependingly by blocks 12 and cross members 50 with the cylindrically shaped rearward portion being aligned with apertures or the afore-mentioned cable sheathing dies 52 and 53 formed in end-plates 54. A top plate 56 is provided with an elongated aperture 58 sized to permit the vibrating disk 24 of the bonding tool 26 to pass therethrough.

The cable core surrounded by the cable sheath both enter the rearward aperture or cable guide 52 of the apparatus 48, the cable core is then passed through the opening formed by the cylindrically shaped rearward portion of the anvil 10 while the cable sheath is passed forward around the outer surface of the anvil with the overlapping surfaces extending longitudinally along the top of the anvil. The vibrating disk 24 is moved downwardly through the aperture 58 into engagement with the overlapping surfaces of the cable sheath which are then bonded together in a continuous longitudinal seam by the vibratory energy imparted by the disk in cooperation with the acoustically tuned anvil.

The vibratory disk 24 and anvil 10 having been previously acoustically tuned, as described above, to the vibratory energy imparted by the disk. The cable core with its new bonded sheath is advanced forward onto the take-up reel 38.

The bonding tool may be one of several such tools well known in the art and commercially available. One such bonding tool is Model No. W–2000/125 ORR, produced by Sonobond of Westchester, Pennsylvania.

It will be understood that the present invention is not limited to any specific range of frequencies, but can be practiced utilizing vibratory energy of any frequency at which any given workpieces can be bonded and at which frequency any given anvil can be made to vibrate at its natural, or substantially natural frequency. Any such acoustical system will, of course, be tuned acoustically, such as, by the use of the afore-mentioned empirical approach employing an accelerometer.

It will be understood that many alterations and modifications further may be made in the present invention without departing from the spirit and scope of the invention.

What is claimed is:

1. A method of bonding workpieces together utilizing vibratory energy, which comprises:
    supporting an anvil at one or more points thereof,
    supporting the workpieces in overlapping relation on the anvil, and
    applying vibratory energy to the overlapping portions of the workpieces to bond them together and to produce on said anvil a standing wave pattern having an antinode at the point of application of the vibratory energy and a node at each point at which the anvil is supported.

2. A method of bonding workpieces utilizing vibratory energy to accomplish bonding and to produce a standing wave pattern including an antinode and at least one nodal point intermediate the ends of an elongated anvil for supporting the workpieces during bonding, comprising:
    supporting the anvil at said nodal point,
    placing the workpieces with the to-be-bonded portions thereof overlapping at an antinodal point on the anvil, and
    applying vibratory energy to the overlapping workpieces and anvil to produce said standing wave pattern on the anvil and to bond the workpieces together.

3. A method of vibratory seam bonding in which workpieces to be bonded together are supported on an anvil, said anvil being supported so as to provide an elongated, projecting workpiece supporting section, which comprises:
    moving the workpieces in overlapping relation to continuously present a seam to be bonded along said section,
    applying vibratory energy to the seam at a point along said section sufficient to cause bonding of said seam and to vibrate the anvil, and
    adjusting the point of application of the vibratory energy along said section and seam to the antinode of the vibrating anvil to maximize bonding efficiency.

4. The method of bonding workpieces utilizing vibratory energy and an acoustically tuned anvil, which comprises the steps of:
    supporting said workpieces in overlapping relation on said anvil in predetermined positions,
    vibrating said workpieces and said anvil to bond said workpieces and to set up free vibrations in said anvil which vibrate at substantially the natural frequency of the said anvil and set up a standing wave along said anvil, and
    supporting said anvil at at least two nodal points of said standing wave.

5. The method of bonding workpieces utilizing vibratory energy and an acoustically tuned anvil operating at a substantially resonant condition, which comprises the steps of:
    supporting said workpieces in overlapping relation on said anvil;
    imparting vibratory energy to said workpieces and to said anvil to vibrate and bond said workpieces and to vibrate said anvil to set up free vibrations therein which vibrate at substantially the natural frequency of said anvil and set up a standing wave along said anvil, said vibratory energy being imparted to said workpieces at substantially an antinode of said standing wave;
    supporting said anvil at two substantially nodal points of said standing wave; and
    adjusting the amount of ultrasonic energy imparted so as to reinforce said free vibrations to perpetuate said standing wave whereupon said anvil operates at a substantially resonant condition.

6. The method of bonding workpieces utilizing a vibratory bonding tool and an acoustically tuned anvil, which comprises the steps of:
    supporting said workpieces in overlapping relation on said anvil with portions of said workpieces exposed to said bonding tool;
    bringing said bonding tool into engagement with said exposed portions to impart vibrations to said exposed portions and to said anvil whereupon free vibrations are set up in said anvil at substantially the natural frequency of said anvil and which vibrations set up a standing wave along said anvil, said bonding tool being brought into engagement with said exposed portions at substantially an antinode of said standing wave;
    supporting said anvil at substantially two nodal points of said standing wave; and
    reducing the amount of vibratory energy imparted by said bonding tool so as to reinforce said free vibrations to perpetuate said standing wave so as to cause said anvil to operate at a substantially resonant condition.

7. The method of bonding workpieces having overlapping surfaces, utilizing vibratory bonding apparatus including a vibrating disk, and an actoustically tuned anvil, which comprises the steps of:
    supporting said workpieces on said anvil such that said overlapping surfaces are exposed to said vibrating disk;
    moving said vibrating disk into engagement with said overlapping surfaces to impart vibration to said overlapping surfaces and to said anvil whereupon free vibrations are set up in said anvil at substantially the natural frequency of said anvil and which vibrations set up a standing wave along said anvil, said vibrating disk being brought into engagement with said overlapping surfaces at substantially an antinode of said standing wave;
    supporting said anvil at two substantially nodal points of said standing wave; and
    reducing the amount of vibrations imparted by said vibrating disk to a level sufficient substantially only to reinforce said free vibrations to produce and continue a resonant vibrating condition to said anvil, whereupon said overlapping surfaces are bonded together.

8. Apparatus for bonding workpieces, which comprises:
    an anvil for supporting said workpieces and being supported at two substantially nodal points of a standing wave set up along said anvil by vibration of said anvil at substantially its natural frequency, and vibratory bonding means for engaging said workpieces at an antinode of said standing wave and for imparting vibratory energy to said workpieces and to said anvil to vibrate said anvil at substantially its natural frequency.

9. Apparatus for bonding workpieces utilizing vibratory energy, which comprises:
an anvil, for supporting said workpieces, of generally elongated configuration having a workpiece supporting portion and which varies in thickness from one longitudinal extremity to the other, said anvil being supported for vibration at two substantially nodal points of a standing wave set up along said anvil upon said anvil being vibrated at substantially its natural frequency; and
a vibratory bonding tool including a vibratory disk for engaging said workpieces longitudinally of said anvil at substantially an antinode of said standing wave and for imparting vibrations to said workpieces and said anvil, said vibrations being of substantially the same frequency as said natural frequency of said anvil.

10. Apparatus for supporting workpieces during a bonding operation and designed to be tuned acoustically to a source of vibratory energy, which comprises:
a generally elongated structure having a workpiece supporting portion which varies in thickness from one longitudinal extremity to the other, and
support members for said structure engaging said structure at substantially nodal points of a standing wave set up along said structure upon said structure being vibrated at substantially its natural frequency.

11. Apparatus designed to be tuned acoustically to vibrations imparted by a vibratory bonding disk, and for supporting, during a bonding operation, a cylindrically-shaped cable sheath formed around a cable core and having overlapping longitudinal surfaces, which comprises:
a generally elongated structure tapering from a rearward portion of cylindrical cross-section to a forward portion of generally half-moon cross-section, the interior of said rearward portion of cylindrical cross-section forming a passageway and guide for said cable core and having its internal cross-sectional dimensions sized in accordance with the external cross-sectional dimensions of said cable core, the external cross-sectional dimensions of said structure being sized in accordance with the internal cross-sectional dimensions of said cable sheath, and said structure for supporting said cable sheath with said overlapping surfaces exposed to said vibratory bonding disk and for engagement thereby at substantially an antinode of a standing wave set up along said structure upon said structure being vibrated at substantially its natural frequency by vibrations imparted by said vibratory bonding disk; and
support members for said structure engaging said structure at substantially nodal points of said standing wave.

References Cited
UNITED STATES PATENTS

| 1,251,729 | 1/1918 | Young | 228—47 |
| 3,053,124 | 9/1962 | Balamuth | 29—470.1 |

RICHARD H. EANES, JR., *Primary Examiner.*